United States Patent [19]

Good

[11] Patent Number: 4,609,051
[45] Date of Patent: Sep. 2, 1986

[54] TRIP SHANK MECHANISM

[75] Inventor: Garry R. Good, Kewanee, Ill.

[73] Assignee: Allied Products Corporation, Chicago, Ill.

[21] Appl. No.: 636,488

[22] Filed: Aug. 1, 1984

[51] Int. Cl.⁴ .............................................. A01B 61/04
[52] U.S. Cl. .................................................. 172/266
[58] Field of Search ............... 172/265, 266, 267, 268, 172/261, 264, 705

[56] References Cited

U.S. PATENT DOCUMENTS

| 668,717 | 2/1901 | Rowell | 172/267 |
| 2,690,111 | 9/1954 | Altgelt | 172/266 |
| 4,318,524 | 3/1982 | Degelman | 172/266 |

FOREIGN PATENT DOCUMENTS

| 731389 | 4/1966 | Canada | 172/267 |
| 2483733 | 12/1981 | France | 172/267 |

Primary Examiner—Richard J. Johnson
Attorney, Agent, or Firm—Haverstock, Garrett & Roberts

[57] ABSTRACT

A trip shank mechanism including a tool bar, an upper support member fixedly attached to the upper side of the tool bar, a lower support member fixedly attached to the lower side of the tool bar and a bracket pivotally connected to the lower support member. A toggle link mechanism is supported between the upper support member and the bracket member and includes an upper and a lower link member pivotally connected at respective first portions thereof by a first pivotal connection. A second pivotal connection pivotally mounts a second portion of the upper link member to the upper support member and a third pivotal connection pivotally mounts a second portion of the lower link member to the bracket member. The first pivot connection is located at an intermediate position between the second and third pivot connections. A biasing mechanism mounted on the upper support member with one end thereof pivotally attached to an intermediate portion of the upper link member. The biasing mechanism normally retains the upper and lower link members in substantially linear alignment with each other. An earthworking tool is fixedly attached to the pivotal bracket member and is movable between a working position wherein the upper and lower link members are in substantially linear alignment with each other and the first pivot connection is in a first position spaced from an imaginary plane passing through the axes of the second and third pivot connections and a non-working position wherein the upper and lower link members are angularly related to each other and the first pivot connection is in a second position spaced from the first position.

3 Claims, 5 Drawing Figures

TRIP SHANK MECHANISM

BACKGROUND OF THE INVENTION

1. Field of the Invention

The present invention relates in general to trip shank assemblies for mounting the shank of an earthworking tool, such as a plow or other cultivating implement, to the tool bar of a soil tilling implement, and more specifically relates to such assemblies which trip upon encountering an immovable obstruction and then automatically reset in their operative position after having passed the obstruction.

Cultivatable land often has at least some hidden obstructions in the soil in the form of large and usually immovable objects such as stumps, rocks, or roots which objects may cause considerable damage to earthworking tools which are used in tilling the soil.

Prior art devices have attempted to eliminate, or at least minimize, the damage to earthworking tools by providing trip shank assemblies that allow the earthworking tool to pivot upwardly and rearwardly when encountering an obstruction.

For example, U.S. Pat. Nos. 4,293,043; 4,068,723; 4,054,177; and 3,949,814 provide trip shank mechanisms that utilize a spring biased toggle link assembly. These prior art devices maintain the earthworking tool in the ground under normal conditions but allow the earthworking tool to pivot upwardly and rearwardly when it encounters an obstruction. The toggle link assembly of these prior art devices include angularly related link portions that are pivotally connected and have biasing means exerting a constant compressive force thereon. These prior art devices utilize an "off-center" pivotal connection by angularly connecting the link members together. Stop means are provided to maintain the "off-center" arrangement by preventing the biasing means from forcing the angularly related link members into linear alignment. This arrangement, however, requires biasing means having a high compressive force to maintain the earthworking tool in a working position under normal working loads. This is due to the fact that the toggle link mechanism is already in a partially tripped position due to the angular relationship of the link members. Because the compressive force is high and also because the force is constant or increases throughout the operation of the toggle link mechanism, when the earthworking tool encounters an obstruction the tool is exposed to the obstruction for a relatively long period of time. These devices therefore only slightly minimize the damage to the earthworking tool. In addition, these devices have a significant number of parts requiring a substantial initial cost as well as significant repair costs.

U.S. Pat. No. 4,312,408 discloses an assembly wherein the force of the biasing means progressively decreases as the earthworking tool pivots upwardly and rearwardly. However, this device is incapable of returning the tool into the soil to the operating position and the operator must manually provide for a return movement of the earthworking tool to its operating position.

The present invention overcomes these prior art inadequacies by providing a toggle link mechanism having substantially linearly aligned link members having a pivotal connection connecting the link members together which connection is "off-center" when the earthworking tool is in a working position. This allows the toggle link mechanism to play a larger part in maintaining the earthworking tool in a working position as opposed to the prior art devices wherein the biasing means provides the major force for maintaining the earthworking tool in a working position. Therefore, biasing means having less of a compressive force can be utilized in the present invention to maintain the earthworking tool in a working position. In addition, the present invention provides an arrangement of biasing means and toggle link mechanism wherein the compressive force decreases as the toggle link mechanism collapses. The present invention therefore allows the earthworking tool to pivot away from an obstruction in the ground with little resistance thereby decreasing the time the tool is exposed to the obstruction. The toggle link mechanism also provides sufficient force to return the earthworking tool to its operating position. Furthermore, the toggle link mechanism is of relatively simple design having a minimum number of parts thereby reducing the initial cost of such device as well as the cost of repair.

It is a principal object of the present invention to provide an improved trip shank mechanism which will maintain an earthworking tool in working position under normal conditions and allow the earthworking tool to pivot upwardly and rearwardly when encountering an obstruction.

A further object of the present invention is to eliminate or substantially reduce the amount of damage incurred when an earthworking tool encounters an obstruction.

Another object of the present invention is to provide a trip shank mechanism having a minimum number of parts and being of a relatively simple design.

Still another object of the present invention is to provide a trip shank mechanism that requires a relatively low compressive force to maintain the earthworking tool in a working position.

Still another object of the present invention is to provide a trip shank mechanism wherein the mechanical advantage of the biasing means decreases as the toggle linkage collapses.

A further object of the present invention is to provide a trip shank mechanism wherein the earthworking tool is returned to a working position after moving over an obstruction.

SUMMARY OF THE INVENTION

The present invention provides a trip shank mechanism comprising a frame member, a toggle link mechanism, means for pivotally mounting the toggle link mechanism, means for pivotally mounting the shank of an earthworking tool and biasing means. The frame member, which can form the cross member of a conventional tool bar apparatus or similar device, includes a pair of support members that are fixedly attached on opposite sides of the frame member to form a top and bottom support member. Each support member comprises a horizontally extending plate member having spaced side wall portions extending vertically therefrom. The top support member includes biasing means mounted thereon between the vertically extending side wall portions and means for pivotally receiving the upper portion of the toggle link mechanism. The bottom support member includes a pivotally attached bracket member that has the shaft of the earthworking tool fixedly attached thereto and means for pivotally receiving the lower portion of the toggle link mechanism. The toggle link mechanism comprises first and second link members. The first link member includes spaced, substantially parallel arm members, means at one end for pivotally connecting to the second link member, means at the opposite end for pivotally connecting the link member to the upper support member, and means for pivotally connecting the biasing means thereto. The second link member includes substantially parallel arm members spaced to receive the first link member therebetween, means at one end for pivotally receiving the first link member and means at the opposite end for pivotally connecting the link member to the bracket member.

The present invention resides in providing a toggle link mechanism which has first and second link members that are positioned in substantially linear alignment with each other and a pivotal connection for connecting the two link members that is spaced from a plane passing through the pivotal connection of the first link member and upper support member and the pivotal connection of the second link member and bracket member so that the pivotal connection between the first and second link members is "off-center" in a direction toward the rear of the device when the link members are in linear alignment with each other. This assures that the toggle link mechanism will collapse to the rear of the device. To further prevent the toggle link mechanism from collapsing in a forward direction, stops are provided on each link member. The first link member has a stop that extends across and beyond the parallel arm members and is positioned to prevent the arm members of the second link member from moving in a forward direction past the first link member. The second link member has a stop that extends across the parallel arm members and is positioned to engage the arms of the first link member when the second link member begins to move in a forward direction. In operation, the biasing means are adjusted to pull the links against the stops thereby preloading the toggle link mechanism wherein the first and second link members are in linear alignment with each other with the pivotal connection of the link members remaining "off-center". Therefore, any compressive force in the linkage will create a rotational moment.

Force applied on the earthworking tool generates a compressive force in the linkage, but rotation is opposed by the biasing means. The biasing means can therefore be adjusted so that normal work loads will not be sufficient to trip the mechanism. When an obstruction in the ground is encountered, sufficient force is applied to cause the shank to begin to move in an upward and rearward direction. When this occurs, the toggle link mechanism collapses thereby decreasing the mechanical advantage of the biasing means to reduce the force on the shank by allowing the shank to snap upwardly and rearwardly.

DETAILED DESCRIPTION OF THE INVENTION

Figure 1:
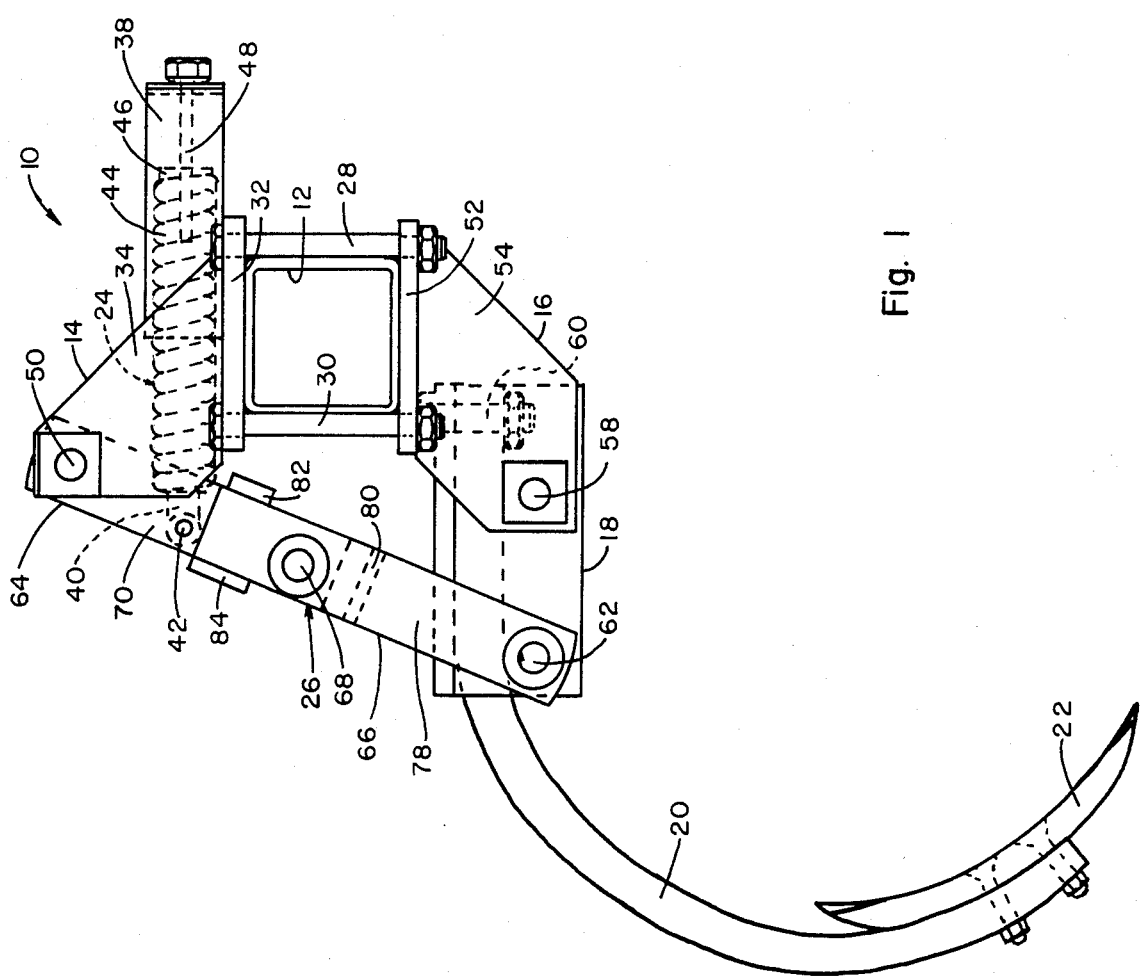
FIG. 1 is a side elevational view of a trip shank mechanism constructed according to the teachings of the present invention wherein the earthworking tool is in the normal operative position.
Figure 2:
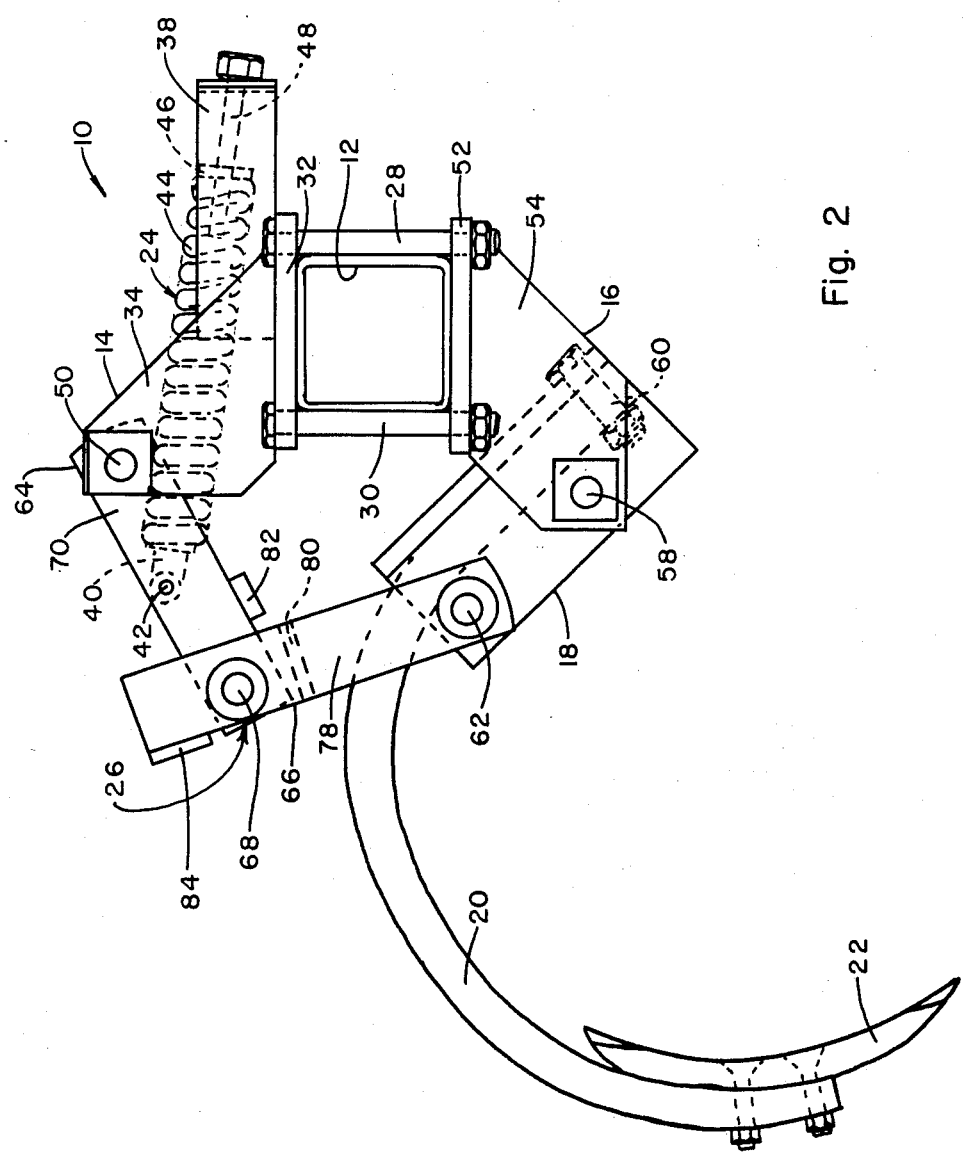
FIG. 2 is a side elevational view similar to FIG. 1, illustrating the earthworking tool in the tripped position.

The overall arrangement of the preferred embodiment of the trip shank mechanism constructed according to the teachings of the present invention is shown in FIGS. 1 and 2 by reference numeral 10. The trip shank mechanism 10 includes a frame member 12, support members 14 and 16, a bracket member 18, a shank 20 of an earthworking tool 22, biasing means 24 and a toggle link mechanism 26.

Frame member 12, which can form the cross member of a conventional tool bar apparatus or similar device, has support members 14 and 16 fixedly attached on opposite sides of the frame member to form a top support member, designated as 14, and a bottom support member, designated as 16. As shown in FIGS. 1 and 2, nut and bolt arrangements 28 and 30 are used to fixedly attach support members 14 and 16 to frame member 12. However, other means such as welding means could also be used to fixedly attach the support members to the frame member. In addition, more than two bolt members could be utilized.

Figure 3:
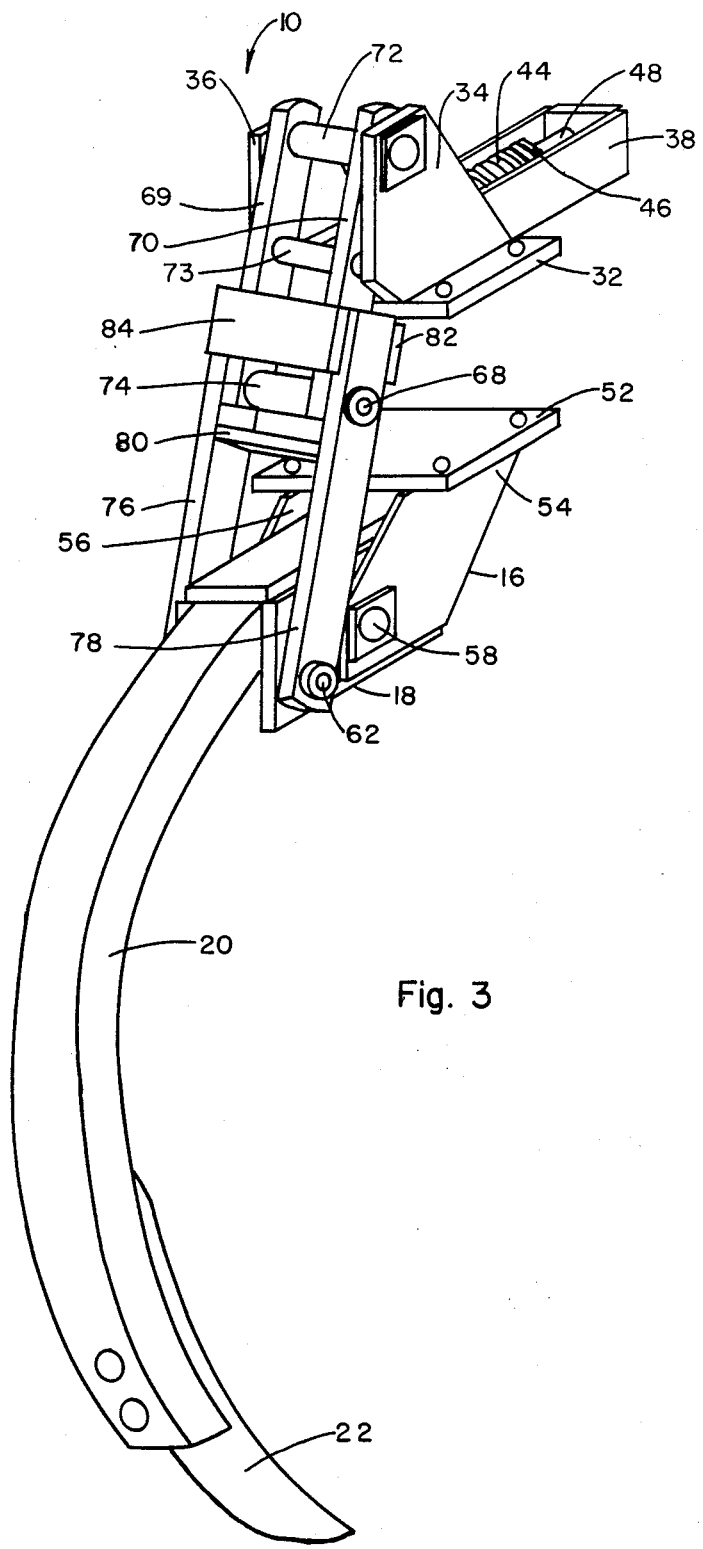
FIG. 3 is a perspective view of a trip shank mechanism constructed according to the teachings of the present invention.

The top support member 14 includes a horizontally extending plate member 32 having spaced side wall portions 34 and 36 extending vertically therefrom. A U-shaped mounting member 38 is fixedly attached to plate member 32 between side wall portions 34 and 36 for mounting biasing means 24 as shown in FIG. 3. Biasing means 24 is positioned on mounting member 38 with spring end member 40 being pivotally mounted to toggle link mechanism 26 at pivotal connection 42. The spring end member 40 is attached to one end of tension spring 44. The other end of tension spring 44 has another spring end member 46 mounted therein into which a bolt 48 is threadedly attached. The bolt 48 passes through U-shaped mounting member 38 and provides for tension adjustment of spring 44. Biasing means 24 rotates as required by movement of the toggle link mechanism 26 as shown in FIG. 2. In this regard, U-shaped mounting member 38 may be pivotally attached to plate member 32 to further provide means for rotating biasing means 24. Top support member 14 also includes a pivotal connection 50 for pivotally mounting one end of the toggle link mechanism 26 thereto.

The bottom support member 16 includes a horizontally extending plate member 52 having spaced side wall portions 54 and 56 extending vertically therefrom. Bracket member 18 is pivotally connected to support member 16 between vertically extending sidewall portions 54 and 56 at pivotal connection 58. Shank 20 of earthworking tool 22 is fixedly attached to bracket member 18 as by bolting or welding. FIGS. 1 and 2 show shank 20 fixedly attached to bracket member 18 by a nut and bolt arrangement 60. Support member 16 also includes a pivotal connection 62 for pivotally mounting one end of the toggle link mechanism 26 thereto.

Toggle link mechanism 26 is comprised of a top link member 64 and bottom link member 66 pivotally connected at respective first portions thereof at pivotal connection 68. As shown in FIG. 3, top link member 64 has spaced parallel arm members 69 and 70 connected by spacer members 72, 73 and 74. Bottom link member 66 likewise has parallel arm members 76 and 78 connected by a plate member 80 which arm members are spaced to receive top link member 64 therebetween. Top link member 64 is pivotally connected to top support member 14 at pivotal connection 50 and bottom link member 66 is pivotally connected to bracket member 18 at 62.

The present invention resides in providing link members that are linearly aligned with each other, which link members are pivotally connected at an "off-center" pivotal connection. To this end, biasing means 24 is pivotally connected to top link member 64 at pivotal connection 42 and urges top link member 64 and bottom link member 66 into linear alignment wherein pivotal connection 68 is spaced from an imaginary plane that passes through the axes of pivotal connections 50 and 62. Stop members 82 and 84 prevent pivotal connection 68 from moving through the plane. Stop member 82 is a transversely extending plate member that is positioned on top link member 64 and extends beyond parallel arm members 69 and 70 to abut the parallel arm members 76 and 78 of bottom link member 66 as it begins to move in a direction which will cause pivotal connection 68 to pass through the plane. Stop member 84 is a transversely extending plate member positioned on bottom link member 66 and extends between parallel arm members 76 and 78 to abut the parallel arm members 69 and 70 of upper link member 64 as it begins to move in a direction that will cause pivotal connection 68 to pass through the imaginary plane. Biasing means 24 can be adjusted to pull link members 64 and 66 against stop members 82 and 84 thereby preloading the toggle link mechanism with the pivotal connection 68 remaining spaced from the imaginary plane through the axes of pivotal connections 50 and 62. In this manner, any compressive force in the linkage will create a rotational moment causing pivotal connection 68 to move in a direction away from the plane thereby allowing the toggle link mechanism to collapse in a rearward direction.

It should be noted, however, that the toggle link mechanism and biasing means arrangement could be reversed wherein the pivotal connection pivotally mounting the top link member to the bottom link member is spaced forwardly of the plane. The stops and direction of force exerted by the biasing means would also be reversed. In this manner the toggle link mechanism would collapse in the forward direction. However, this arrangement would require a greater distance between the spaced apart top and bottom support members and is therefore not as practical as the preferred embodiment as discussed herein. It should also be noted that biasing means other than the compression spring disclosed herein can be utilized in the practice of the present invention. Such biasing means may include hydraulic cylinders or other spring type biasing means.

Figure 4:
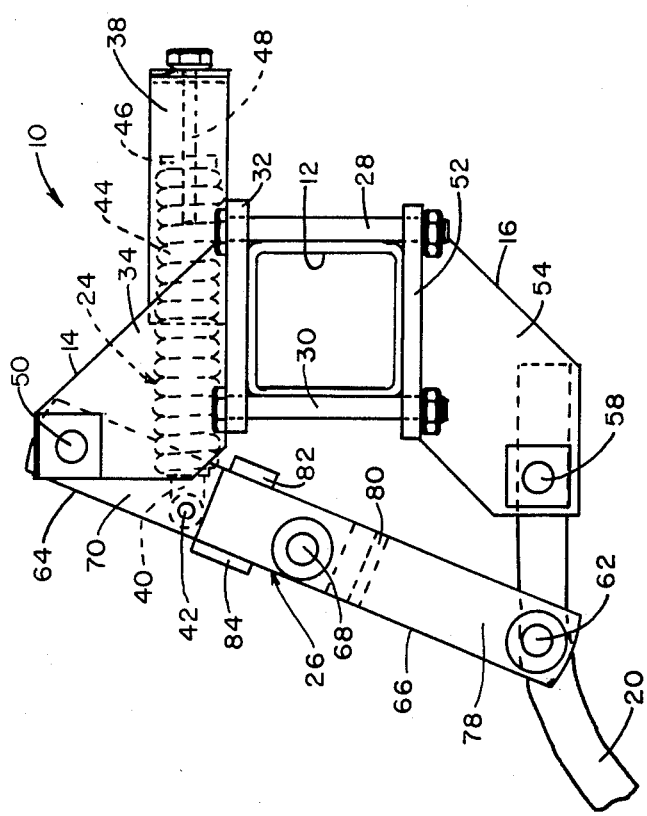
FIG. 4 is a side elevational view of an alternate embodiment of the present invention wherein the earthworking tool is in a working position.
Figure 4:
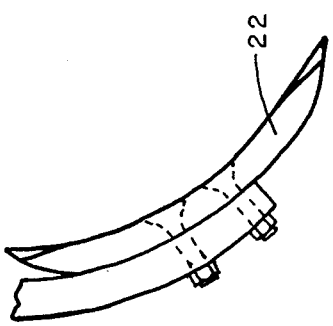
Figure 5:
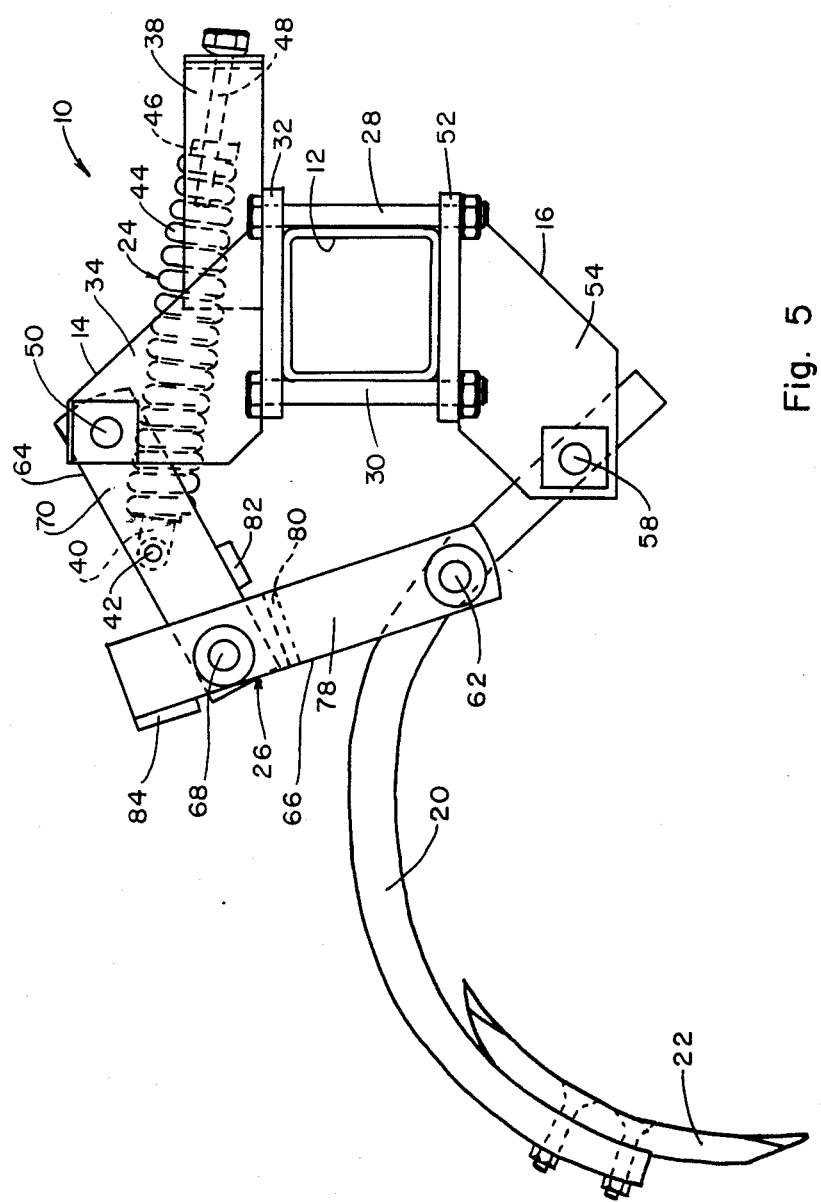
FIG. 5 is a side elevational view similar to FIG. 4, illustrating the earthworking tool in the tripped position.

As shown in FIG. 4 in an alternate embodiment, it is contemplated to do away with bracket member 18. Shank 20 is then pivotally connected to bottom support member 16 at 58 and bottom link member 66 is pivotally connnected to shank 20 by pivotal connection 62.

During normal plowing operation, the components of the present invention will be situated as shown in FIG. 1 with the biasing means being adjusted to preload the toggle link mechanism 26. Since the top link member 64 and bottom link member 66 are in linear alignment with each other, biasing means 24 need not have a high compressive force to maintain the earthworking tool 22 in a working position. Therefore, with the biasing means being adjusted so that normal work loads will not be sufficient to trip toggle link mechanism 26, the earthworking tool 22 can perform its usual function. However, when an obstruction in the ground is encountered, sufficient force will be applied to earthworking tool 22 to cause shank 20 to begin to move in an upward direction toward top support member 14 and also in a rearward direction away from frame member 12. This causes bottom link member 66 to create a rotational moment in the toggle link mechanism 26. Stop members 82 and 84 prevent movement of pivotal connection 68 through the imaginary plane passing through pivotal connections 50 and 62 thereby causing pivotal connection 68 to move in a direction away from the imaginary plane and thereby collapsing toggle link mechanism 26. Since the compressive force of biasing means 24 is relatively low, the collapsing occurs quickly thereby snapping the earthworking tool away from the obstruction to the position shown in FIG. 2. The earthworking tool is therefore moved away from the obstruction in a relatively short period of time thereby preventing damage to the earthworking tool when an obstruction is encountered. Devices utilizing biasing means having a high compressive force expose the earthworking tool to the obstruction for a longer period of time causing more damage to the tool than occurs with the present invention.

The earthworking tool 20 returns to the working position from the position shown in FIG. 2 due to gravitational forces acting upon the earthworking tool in conjunction with the biasing means acting upon toggle link mechanism 26. Gravitational forces act upon the tool 20 to start the return and as it moves downward the mechanical advantage of biasing means 24 increases. As the mechanical advantage increases a greater compressive force in conjunction with the gravitational force causes the tool 20 to gain sufficient momentum to pierce the ground thereby returning to the normal working position. When the tool 20 is returned to the normal working position, toggle link mechanism 26 is reset.

Thus, there has been shown and described a novel toggle link mechanism for maintaining an earthworking tool in working position under normal conditions and pivoting the earthworking tool from the working position to a tripped position when an obstruction is encountered, which mechanism fulfills all of the objects and advantages sought therefor. It will be apparent to those skilled in the art, however, that many changes, variations, modifications, and other uses and adaptations of the subject device are possible, and all such changes, modifications, variations and other uses and applications which do not depart from the spirit of the present invention are deemed to be covered by the invention which is limited only by the claims which follow.

What is claimed is:

1. An earthworking tool support mechanism comprising a frame member, support means including an upper support member fixedly attached to the upper side of said frame member, a lower support member fixedly attached to the lower side of said frame member, flange means pivotally connected to said lower support member, a toggle link mechanism supported by said support means, said toggle link mechanism including substantially straight upper and lower link members, a first pivot connection pivotally mounting said upper and lower link members together at respective first portions thereof, a second pivot connection pivotally mounting a second portion of said upper link member to said upper support member, a third pivot connection pivotally mounting a second portion of said lower link member to said flange means, said first pivot connection being located at an intermediate position between said second and third pivot connections and being spaced from a plane passing through the axes of said second and third pivot connections when said substantially straight upper and lower link members are linearly aligned thereby defining an off-centered first pivot connection relative to said second and third pivot connections, biasing means mounted on said upper support member having one end pivotally attached to an intermediate portion of said upper link member, said biasing means normally retaining said upper and lower link members in substantially linear alignment with each other, and an earthworking tool fixedly attached to said flange means, said earthworking tool being movable between a working position wherein said upper and lower link members are in substantially linear alignment with each other and said off-centered first pivot connection is in a first position spaced from said plane through the axes of said second and third pivot connections and a non-working position wherein said upper and lower link members are angularly related to each other and said first pivot connection is in a second position further spaced from said plane, including stop means mounted on said upper and lower link members for preventing said first pivot connection from moving to and through said plane under urging of said biasing means.

2. The mechanism of claim 1 wherein said flange means comprises a bracket member.

3. In an earthworking tool support mechanism having a tool bar associated therewith, support means attached to said tool bar, said support means including flange means pivotally connected thereto at one end thereof, an earthworking tool, and means for fixedly attaching said earthworking tool to said flange means, an improved toggle link mechanism supported by said support means and comprising substantially straight upper and lower link members, a first pivot connection pivotally mounting said upper and lower link members together at respective first portions thereof, a second pivot connection pivotally mounting a second portion of said upper link member to the opposite end of said support means, a third pivot connection pivotally mounting a second portion of said lower link member to said flange means, said first pivot connection being located at an intermediate position between said second and third pivot connections and being spaced from a plane passing through the axes of said second and third pivot connections when said substantially straight upper and lower link members are linearly aligned thereby defining an off-centered first pivot connection relative to said second and third pivot connections, biasing means mounted on the opposite end of said support means, said biasing means having one end pivotally attached to an intermediate portion of said upper link member, said biasing means normally retaining said earthworking tool in a working position wherein said off-centered first pivot connection is in a first position spaced from said plane passing through the axes of said second and third pivot connections and said upper and lower link members are in substantially linear alignment with each other, said earthworking tool being movable to a non-working position wherein said off-centered first pivot connection is moved to a second position further spaced from said plane and said upper and lower link members are angularly related to each other, and stop means mounted on said upper and lower link members for preventing said off-centered first pivot connection from moving to and through said plane under urging of said biasing means.

* * * * *